US009870332B2

(12) United States Patent
Petrick et al.

(10) Patent No.: US 9,870,332 B2
(45) Date of Patent: *Jan. 16, 2018

(54) PROTOCOL CONVERSION SYSTEM

(71) Applicant: Dell Products L.P., Round Rock, TX (US)

(72) Inventors: Christopher Stephen Petrick, Cedar Park, TX (US); Rabah S Hamdi, Spring, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,919

(22) Filed: Apr. 11, 2017

(65) Prior Publication Data
US 2017/0220504 A1 Aug. 3, 2017

Related U.S. Application Data

(63) Continuation of application No. 14/141,700, filed on Dec. 27, 2013, now Pat. No. 9,639,498.

(51) Int. Cl.
*G06F 13/20* (2006.01)
*H04J 14/02* (2006.01)
*G06F 13/38* (2006.01)
*G06F 13/42* (2006.01)
*G06F 1/26* (2006.01)
*G06F 13/40* (2006.01)

(52) U.S. Cl.
CPC .......... *G06F 13/387* (2013.01); *G06F 1/266* (2013.01); *G06F 13/4018* (2013.01); *G06F 13/426* (2013.01)

(58) Field of Classification Search
None
See application file for complete search history.

(56) References Cited

U.S. PATENT DOCUMENTS

| 8,989,590 | B2* | 3/2015 | Wojtowicz | H04B 10/40 398/135 |
| 2006/0098681 | A1* | 5/2006 | Cafiero | H04L 12/4625 370/445 |
| 2011/0033188 | A1* | 2/2011 | Elbers | H04J 14/02 398/79 |

(Continued)

*Primary Examiner* — Hyun Nam
(74) *Attorney, Agent, or Firm* — Haynes and Boone, LLP

(57) ABSTRACT

An Ethernet/Fiber Channel conversion system includes a chassis having a first end and a second end that is located opposite the chassis from the first end. An Ethernet interface is located on the first end and is configured to directly mate with an Ethernet port on an Ethernet device. A Fiber Channel interface is located on the second end. An Ethernet/Fiber Channel conversion engine is housed in the chassis and configured to receive Ethernet protocol signals through the Ethernet interface, convert the Ethernet protocol signals to Fiber Channel protocol signals, and send the Fiber Channel protocol signals through the Fiber Channel interface. The Ethernet/Fiber Channel conversion engine is also configured to receive Fiber channel protocol signals from the Fiber Channel IHS through the Fiber Channel interface, convert the Fiber channel protocol signals to Ethernet protocol signals, and send the Ethernet protocol signals through the Ethernet interface.

20 Claims, 14 Drawing Sheets

(56) References Cited

U.S. PATENT DOCUMENTS

2012/0106558 A1* 5/2012 Dickens .............. H04L 12/4625
                                                          370/401
2015/0186325 A1* 7/2015 Petrick .................. G06F 13/426
                                                          710/313
2016/0050277 A1* 2/2016 Kirk .................... H04L 67/1097
                                                          370/392

* cited by examiner

PROTOCOL CONVERSION SYSTEM

CROSS-REFERENCE TO RELATED APPLICATIONS

This is a Continuation application to U.S. Utility application Ser. No. 14/141,700 filed Dec. 27, 2013, entitled "PROTOCOL CONVERSION SYSTEM," the disclosure of which is incorporated herein by reference in its entirety.

BACKGROUND

The present disclosure relates generally to information handling systems, and more particularly to a protocol conversion system for providing for communications between information handling systems operating according to different communications protocols.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, Ethernet IHSs, include the ability to transmit and receive Ethernet protocol communications via transceivers such as Small Form-factor Pluggable (SFP) transceivers, enhanced Small Form-factor Pluggable (SFP+) transceivers, 10 Gigabit Small Form-factor Pluggable (XFP) transceivers, and/or Quad (4-channel) Small Form-factor Pluggable (QSFP or QSFP+) transceivers. In some situations, users may wish to use those Ethernet IHSs to communicate with Fibre Channel IHSs. In order to do so, those users must purchase converged switch IHSs that support multiple communication protocols (e.g., Fibre Channel over Ethernet (FCoE)), and those converged switch IHSs are very costly.

Accordingly, it would be desirable to provide an improved system for providing communication between Ethernet IHSs and Fibre Channel IHSs.

SUMMARY

According to one embodiment, an Ethernet/Fibre Channel conversion system includes a chassis having a first end and a second end that is located opposite the chassis from the first end; an Ethernet interface located on the first end of the chassis, wherein the Ethernet interface is configured to directly mate with an Ethernet port on an Ethernet device; a Fibre Channel interface located on the second end of the chassis; a protocol conversion processor that is housed in the chassis and that is coupled between the Ethernet interface and the Fibre Channel interface; and a non-transitory memory storing instructions that, when executed by the protocol conversion processor, cause the protocol conversion processor to: receive first Ethernet protocol signals through the Ethernet interface, convert the first Ethernet protocol signals to first Fibre Channel protocol signals, and send the first Fibre Channel protocol signals through the Fibre Channel interface; and receive second Fibre channel protocol signals through the Fibre Channel interface, convert the second Fibre channel protocol signals to second Ethernet protocol signals, and send the second Ethernet protocol signals through the Ethernet interface.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
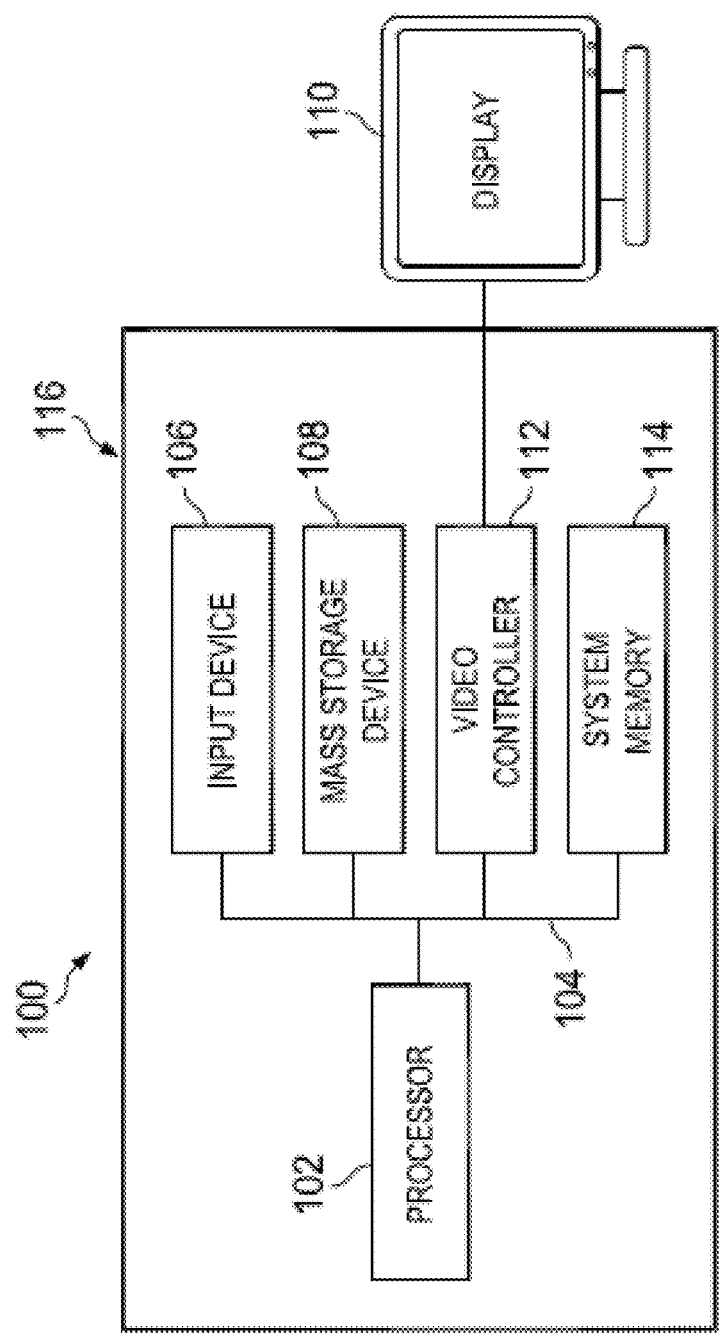
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
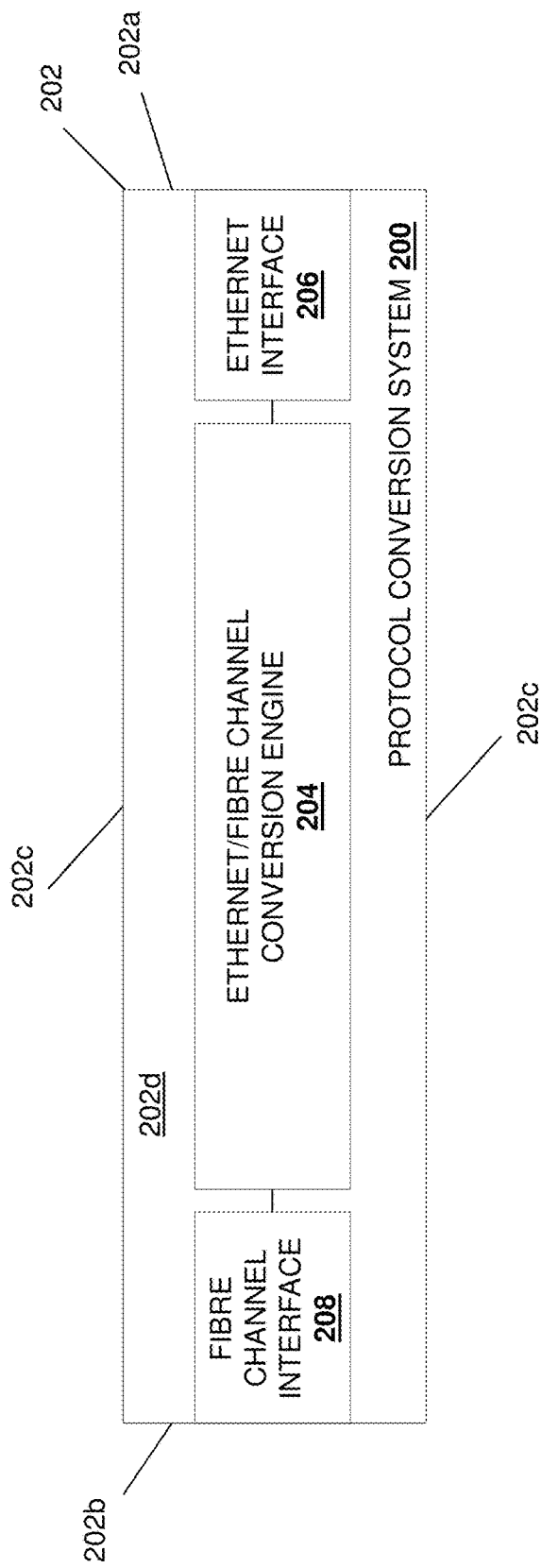
FIG. 2 is a schematic view illustrating an embodiment of a protocol conversion system.

Referring now to FIG. 2, an embodiment of a protocol conversion system 200 is illustrated. In the embodiments discussed below, the protocol conversion system 200 is described as an Ethernet/Fibre Channel conversion device, but other embodiments may provide for the conversion between other protocols. In some of the embodiments discussed below, the protocol conversion system 200 is referred to as a pluggable protocol conversion transceiver. The protocol conversion system 200 includes an elongated chassis 202 having a first end 202a, a second end 202b located opposite the elongated chassis 202 from the first end 202a, and a plurality of side walls 202c extending between the first end 202a and the second end 202b. The elongated chassis 202 defines a chassis housing 20d between the first end 202a, the second end 202b, and the side walls 202c that houses protocol conversion components (discussed in further detail below) that provide a protocol conversion engine such as the Ethernet/Fibre Channel conversion engine 204 illustrated in FIG. 2. The Ethernet/Fibre Channel conversion engine 204 is communicatively coupled to an Ethernet interface 206 that is located on the first end 202a of the elongated chassis 202, and to a Fibre Channel interface 208 that is located on the second end 202b of the elongated chassis 202. In an embodiment, any or all of the protocol conversion components may receive power through the Ethernet interface 206 using, for example, Power over Ethernet (PoE) methods known in the art. In the embodiments illustrated and described below, the Ethernet interface 206 is the only Ethernet interface located on the elongated chassis 202 and the Fibre Channel interface 208 is the only Fiber Channel interface on the elongated chassis 202. However, in other embodiments, more than one Ethernet interface and/or more than one Fibre Channel interface may be included on the elongated chassis 202.

Figure 3:
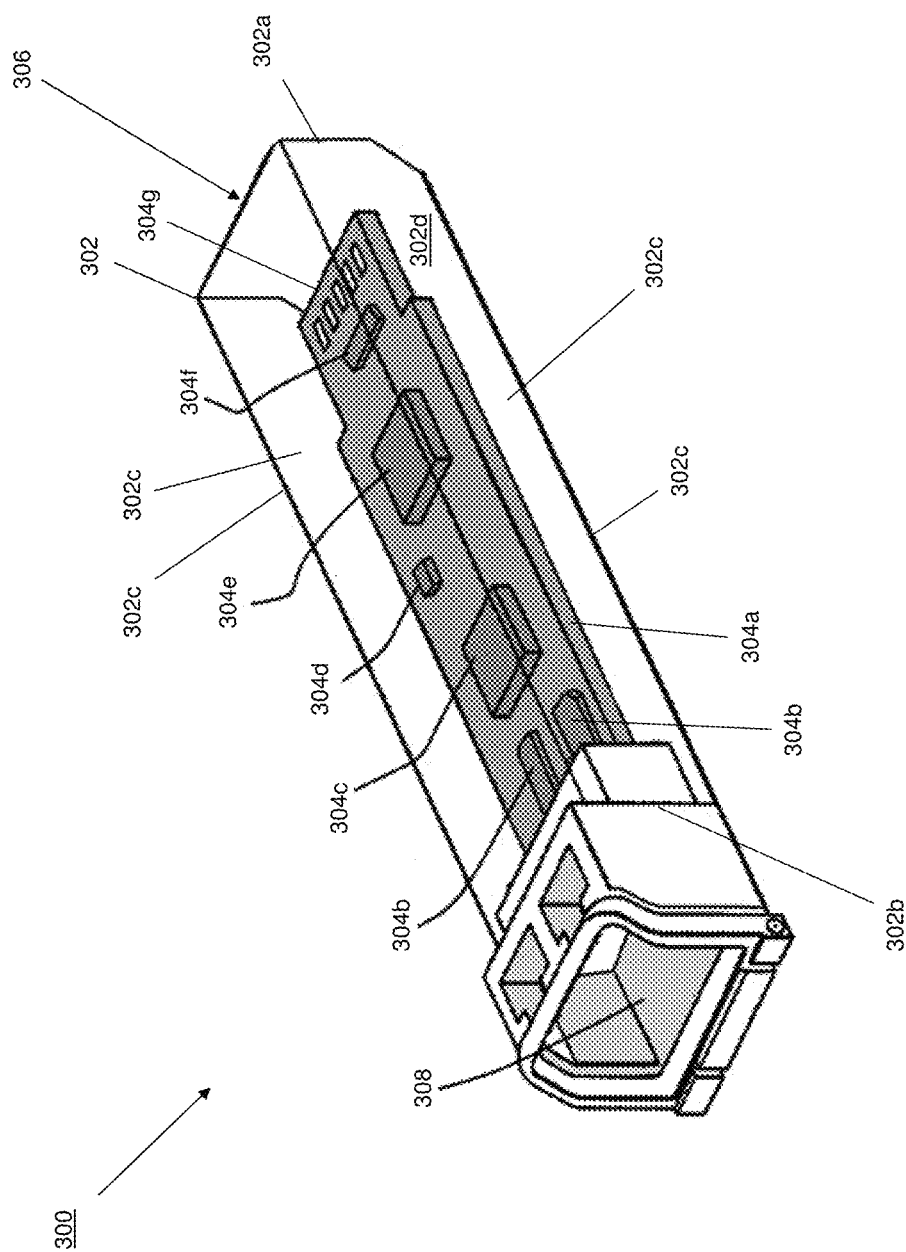
FIG. 3 is a cut-away perspective view illustrating an embodiment of the protocol conversion system illustrated in FIG. 2.

Referring now to FIG. 3, an embodiment of a protocol conversion system 300 is illustrated. The embodiment of the protocol conversion system 300 illustrated in FIG. 3 is referred to below as a pluggable Ethernet/Fibre Channel protocol conversion transceiver 300, but as discussed above, other protocols and chassis configurations will fall within the scope of the present disclosure. The pluggable Ethernet/Fibre Channel protocol conversion transceiver 300 includes an elongated chassis 302 (which may be the elongated chassis 202 discussed above with reference to FIG. 2) having a first end 302a (which may be the first end 202a discussed above with reference to FIG. 2), a second end 302b (which may be the second end 202b discussed above with reference to FIG. 2) located opposite the elongated chassis 302 from the first end 302a, and a plurality of side walls 302c (which may be the side walls 202c discussed above with reference to FIG. 2) extending between the first end 302a and the second end 302b. The elongated chassis 302 defines a chassis housing 30d (which may be the chassis housing 20d discussed above with reference to FIG. 2) that houses protocol conversion components 304 that provide a protocol conversion engine such as the Ethernet/Fibre Channel conversion engine 204 discussed above with reference to FIG. 2.

In the illustrated embodiment, the protocol conversion components 304 include a circuit board 304a that is located in the chassis housing 30d and that includes electrically coupled together (e.g., via traces or other components on the circuit board) Fibre Channel interface components 304b such as a laser driver and laser receiver, an optical driver component 304c such as a Fibre Channel signal processor, a memory device component 304d such as an electrically erasable programmable read-only memory (EEPROM), a protocol conversion processor component 304e such as a central processing unit (CPU), and an electrical interface and line driver component 304f such as an Ethernet signal processor. While an example of protocol conversion components 304 has been provided, one of skill in the art will recognize that a variety of other protocol conversion components may be utilized while remaining within the scope of the present disclosure. In the illustrated embodiment of the pluggable Ethernet/Fibre Channel protocol conversion transceiver 300, a male Small Form-factor Pluggable (SFP) (or enhanced SFP (SFP+)) connector 306 is provided as the Ethernet interface (e.g., the Ethernet interface 206 discussed above with reference to FIG. 2) that is located on the first end 302a of the elongated chassis 302. One of skill in the art will recognize that SFP connectors are not standardized by any official standards body, but rather specified by a Multi-Source Agreement (MSA) among competing manufacturers. As such, a variety of MSA compliant connectors may be substituted for the SFP connector 306 illustrated in FIG. 3. The SFP connector 306 may be provided by the structure of the first end 302a of the elongated chassis 302, as well as by a connector end 304g of the circuit board 304a that is electrically coupled to the other components on the circuit board 302a. As discussed above, any of the protocol conversion components 304 on the circuit board 304a may receive power through the SFP connector 306 using PoE methods known in the art. In the illustrated embodiment of the pluggable Ethernet/Fibre Channel protocol conversion transceiver 300, a female Fibre Channel port 308 is provided as the Fibre Channel interface (e.g., the Fibre Channel interface 208 discussed above with reference to FIG. 2) that is located on the second end 302b of the elongated chassis 302. For example, the female Fibre Channel port 308 may be a bidirectional (BiDi) optical port, a Lucent/Little/Local Connector (LC) optical port, a duplex LC optical port, a Subscriber/Square/Standard Connector (SC) optical port, a Multiple Fiber Push-On/Pull-Off (MTP/MPO) optical port, and/or a variety of other optical port known in the art. The female Fibre Channel port 308 is coupled to the first end 302a of the elongated chassis 302 and to the circuit board 204a such that the female Fibre Channel port 308 is electrically coupled to the components on the circuit board 302a.

Figure 4:
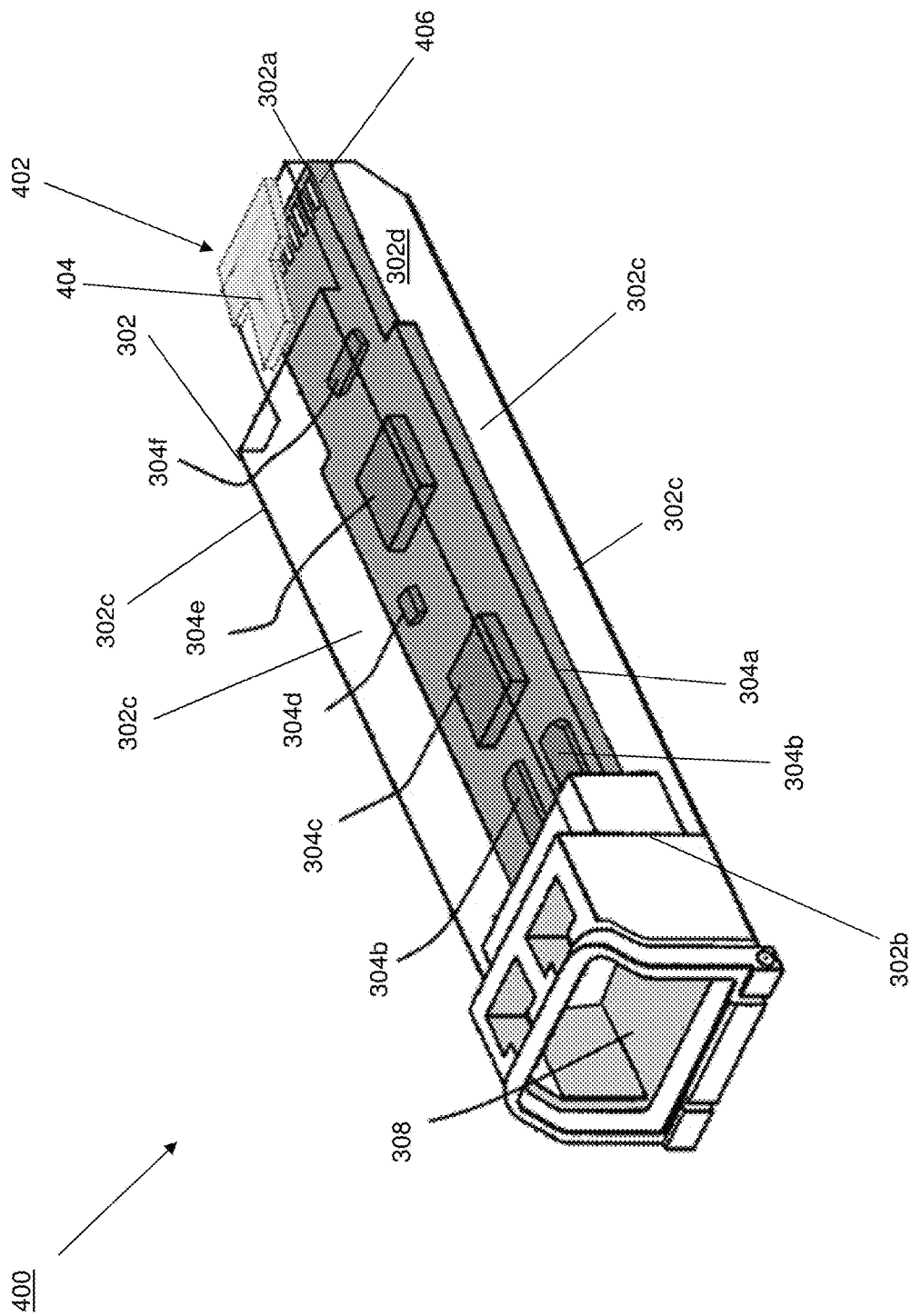
FIG. 4 is a cut-away perspective view illustrating an embodiment of the protocol conversion system illustrated in FIG. 2.

Referring now to FIG. 4, an embodiment of a protocol conversion system 400 is illustrated that is substantially similar in structure and function to the protocol conversion system 300 discussed above with reference to FIG. 3, but with a few modifications discussed below. The embodiment of the protocol conversion system 400 illustrated in FIG. 4 is referred to below as a pluggable Ethernet/Fibre Channel protocol conversion transceiver 400, but as discussed above, other protocols and chassis configurations will fall within the scope of the present disclosure. The pluggable Ethernet/Fibre Channel protocol conversion transceiver 400 includes the elongated chassis 302 with the first end 302a, second end 302b, and side walls 302c that define the chassis housing 30d which houses the protocol conversion components 304 for providing the protocol conversion engine, as discussed above with reference to FIG. 3. In the illustrated embodiment of the pluggable Ethernet/Fibre Channel protocol conversion transceiver 400, a male RJ45 connector 402 is provided as the Ethernet interface (e.g., the Ethernet interface 206 discussed above with reference to FIG. 2) that is located on the first end 302a of the elongated chassis 302. The RJ45 connector 402 may be provided by the structure of the first end 302a of the elongated chassis 302, including a retention clip 404 (known in the art of RJ45 connectors), as well as by a connector end 406 of the circuit board 304a that is electrically coupled to the other components on the circuit board 304a. As discussed above, any of the protocol conversion components 304 on the circuit board 304a may receive power through the RJ45 connector 402 using PoE methods known in the art. In the illustrated embodiment of the pluggable Ethernet/Fibre Channel protocol conversion transceiver 400, the female Fibre Channel port 308 is provided substantially as described above with reference to FIG. 3.

Figure 5:
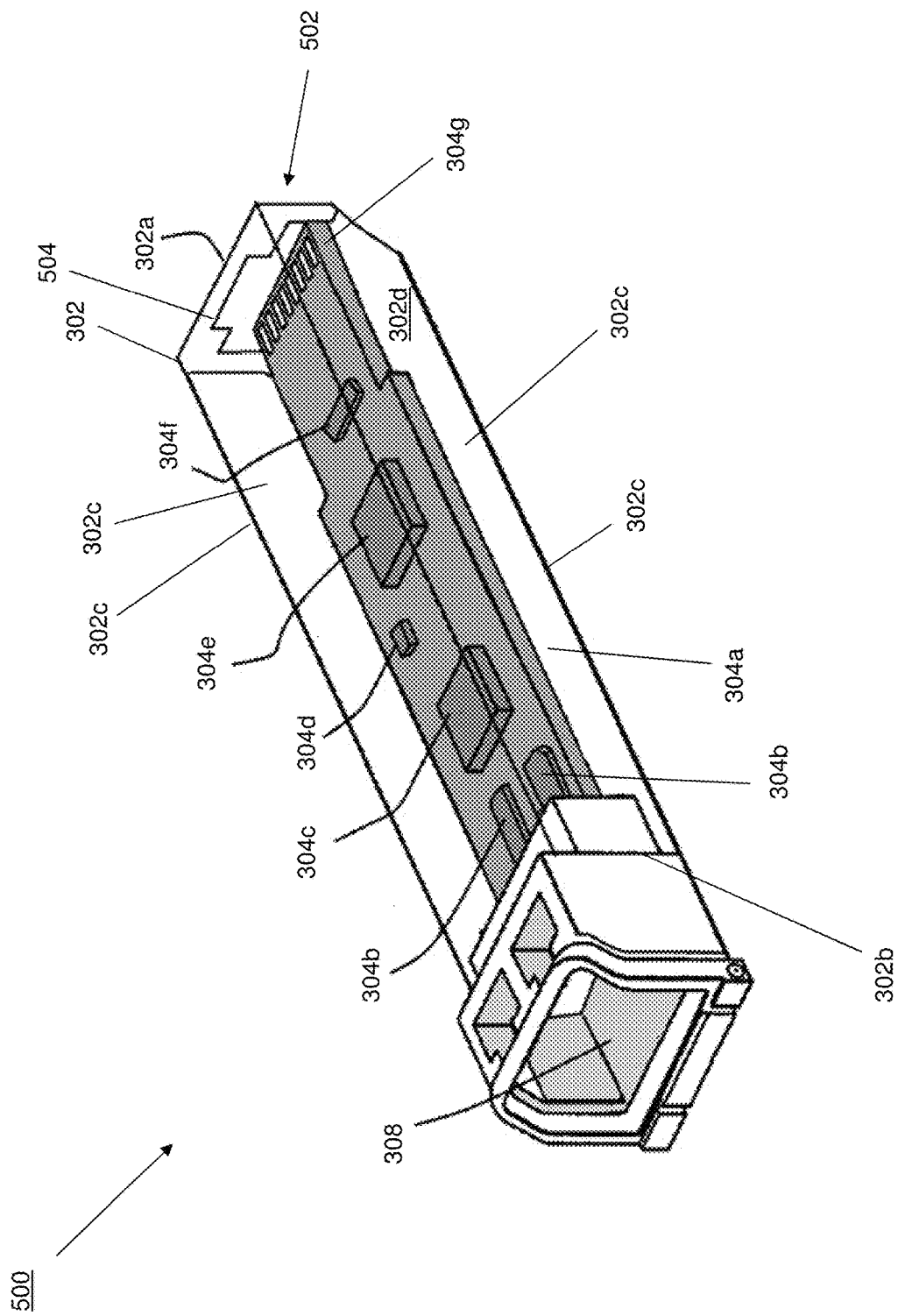
FIG. 5 is a cut-away perspective view illustrating an embodiment of the protocol conversion system illustrated in FIG. 2.

Referring now to FIG. 5, an embodiment of a protocol conversion system 500 is illustrated that is substantially similar in structure and function to the protocol conversion system 300 discussed above with reference to FIG. 3, but with a few modifications discussed below. The embodiment of the protocol conversion system 500 illustrated in FIG. 5 is referred to below as a pluggable Ethernet/Fibre Channel protocol conversion transceiver 500, but as discussed above, other protocols and chassis configurations will fall within the scope of the present disclosure. The pluggable Ethernet/Fibre Channel protocol conversion transceiver 500 includes the elongated chassis 302 with the first end 302a, second end 302b, and side walls 302c that define the chassis housing 30d which houses the protocol conversion components 304 for providing the protocol conversion engine, as discussed above with reference to FIG. 3. In the illustrated embodiment of the pluggable Ethernet/Fibre Channel protocol conversion transceiver 500, a female RJ45 port 502 is provided as the Ethernet interface (e.g., the Ethernet interface 206 discussed above with reference to FIG. 2) that is located on the first end 302a of the elongated chassis 302. The RJ45 port 502 may be provided by the structure of the first end 302a of the elongated chassis 302, which defines a male Ethernet connector entrance and channel 504 (known in the art of RJ45 connectors), as well as by a connector end 506 of the circuit board 304a that is electrically coupled to the other components on the circuit board 302a. As discussed above, any of the protocol conversion components 304 on the circuit board 304a may receive power through the RJ45 port 502 using PoE methods known in the art. In the illustrated embodiment of the pluggable Ethernet/Fibre Channel protocol conversion transceiver 500, the female Fibre Channel port 308 is provided substantially as described above with reference to FIG. 3.

Figure 6:
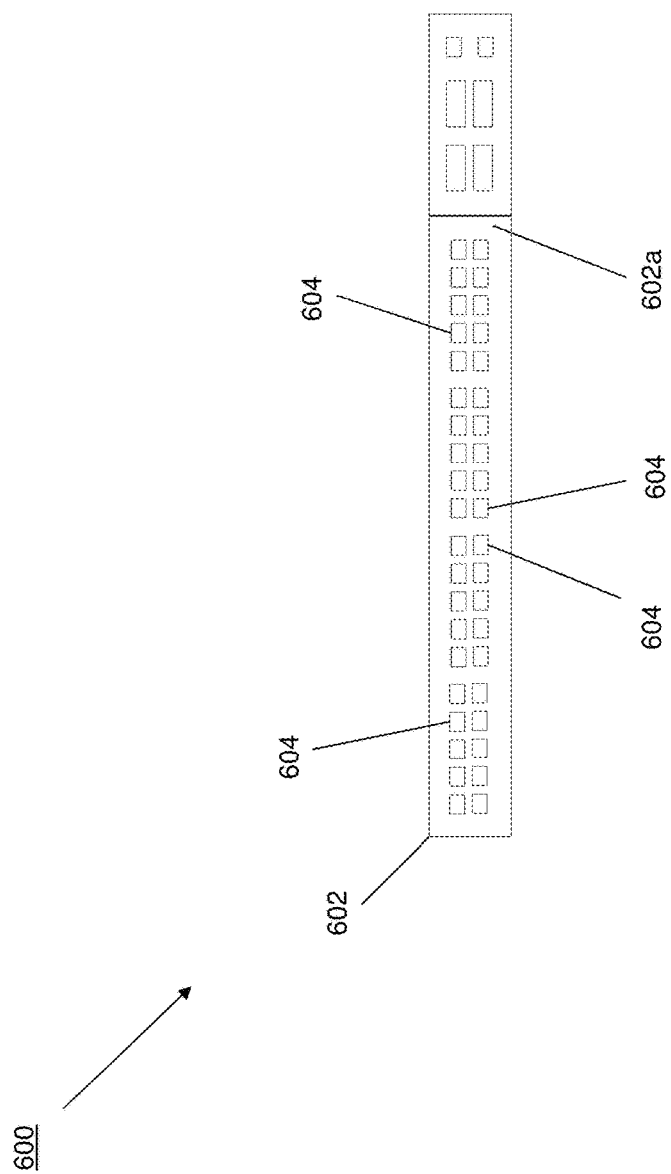
FIG. 6 is a front view illustrating an embodiment of a Ethernet switch IHS.

Referring now to FIG. 6, an embodiment of an Ethernet device 600 is illustrated. The embodiment of the Ethernet device 600 illustrated in FIG. 6 is referred to below as an Ethernet switch IHS 600, but other Ethernet devices and IHSs (e.g., server IHS's, storage IHS's, desktop IHS's, portable IHS's, and/or a variety of other IHSs and devices) are envisioned as falling within the scope of the present disclosure. The Ethernet switch IHS 600 may be the IHS 100, discussed above with reference to FIG. 1, and/or may include some or all of the components of the IHS 100. The Ethernet switch IHS 600 includes a chassis 602 that houses a plurality of Ethernet switch IHS components (e.g., the processor 102, storage device 108, system memory 114, and/or other IHS components discussed above with reference to FIG. 1, switching IHS components know in the art, and/or a variety of other IHS components known in the art). The Ethernet switch IHS 600 also includes an outer surface 602, and a plurality of Ethernet ports 604 are located on the chassis 602 and accessible on the outer surface 602. In an embodiment, the plurality of Ethernet ports 604 are female Ethernet ports. For example, the plurality of Ethernet ports 604 may include female SFP or SFP+ ports, female RJ45 ports, and/or a variety of other female Ethernet ports known in the art. In an embodiment, the Ethernet switch IHS 600 is configured to communicate through the Ethernet ports 604 using Ethernet protocol signals. In some embodiment, the Ethernet switch IHS 600 is configured to communicate through the Ethernet ports 604 using Fibre Channel protocol signals (e.g., FCoE signals). In some embodiments, any of the Ethernet ports 604 may be configured to transmit power using PoE methods known in the art.

Figure 7:
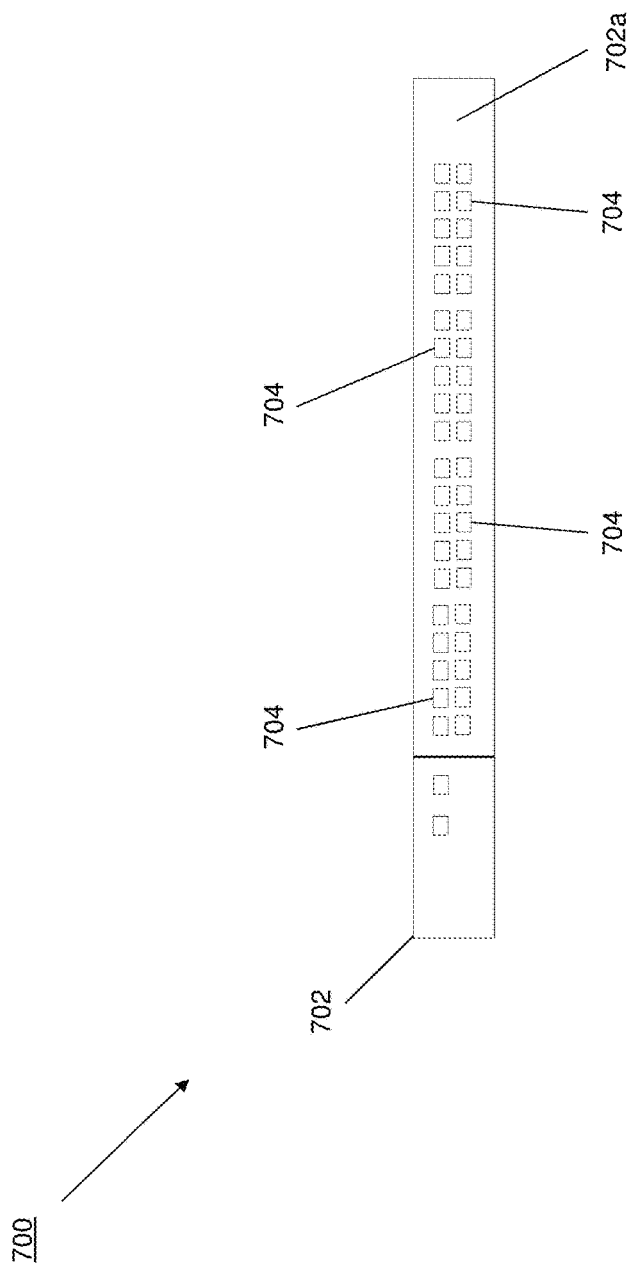
FIG. 7 is a front view illustrating an embodiment of a Fibre Channel switch IHS.

Referring now to FIG. 7, an embodiment of a Fibre Channel device 700 is illustrated. The embodiment of the Fibre Channel device 700 illustrated in FIG. 7 is referred to below as an Fibre Channel switch IHS 700, but other Fibre Channel devices and IHSs (e.g., server IHS's, storage IHS's, desktop IHS's, portable IHS's, and/or a variety of other IHSs and devices) are envisioned as falling within the scope of the present disclosure. The Fibre Channel switch IHS 700 may be the IHS 100, discussed above with reference to FIG. 1, and/or may include some or all of the components of the IHS 100. The Fibre Channel switch IHS 700 includes a chassis 702 that houses a plurality of Fibre Channel switch IHS components (e.g., the processor 102, storage device 108, system memory 114, and/or other IHS components discussed above with reference to FIG. 1, switching IHS components know in the art, and/or a variety of other IHS components known in the art). The Fibre Channel switch IHS 700 also includes an outer surface 702, and a plurality of Fibre Channel ports 704 are located on the chassis 702 and accessible on the outer surface 702. In an embodiment, the plurality of Fibre Channel ports 704 are female Fibre Channel ports. For example, the plurality of female optical connector 308 may include bidirectional (BiDi) optical ports, Lucent/Little/Local Connector (LC) optical ports, duplex LC optical ports, Subscriber/Square/Standard Connector (SC) optical ports, Multiple Fiber Push-On/Pull-Off (MTP/MPO) optical ports, and/or a variety of other optical ports known in the art. In an embodiment, the Fibre Channel switch IHS 700 is configured to communicate through the Fibre Channel ports 704 using Fibre Channel protocol signals.

Figure 8:
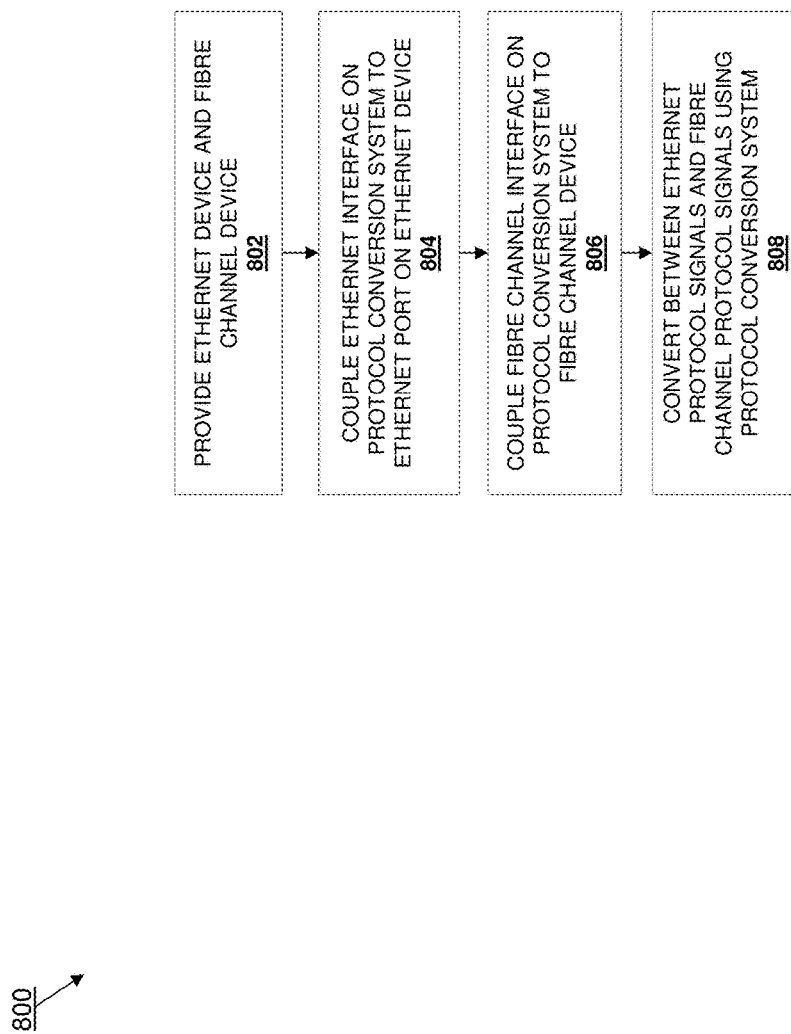
FIG. 8 is a flow chart illustrating an embodiment of a method for providing communication between IHSs.

Referring now to FIG. 8, an embodiment of a method 800 for providing communications between Ethernet and Fibre Channel devices is illustrated. The method 800 begins at block 802 where an Ethernet device and a Fibre Channel device are provided. In an embodiment, the Ethernet switch IHS 600, discussed above with reference to FIG. 6, and the Fibre Channel switch IHS 700, discussed above with reference to FIG. 7, are provided. For example, in the embodiments illustrated in FIGS. 9 and 10 and discussed below, the Ethernet switch IHS 600 and the Fibre Channel switch IHS 700 are provided as part of IHS networks 900 (FIG. 9) and 1000 (FIG. 10).

Figure 9:
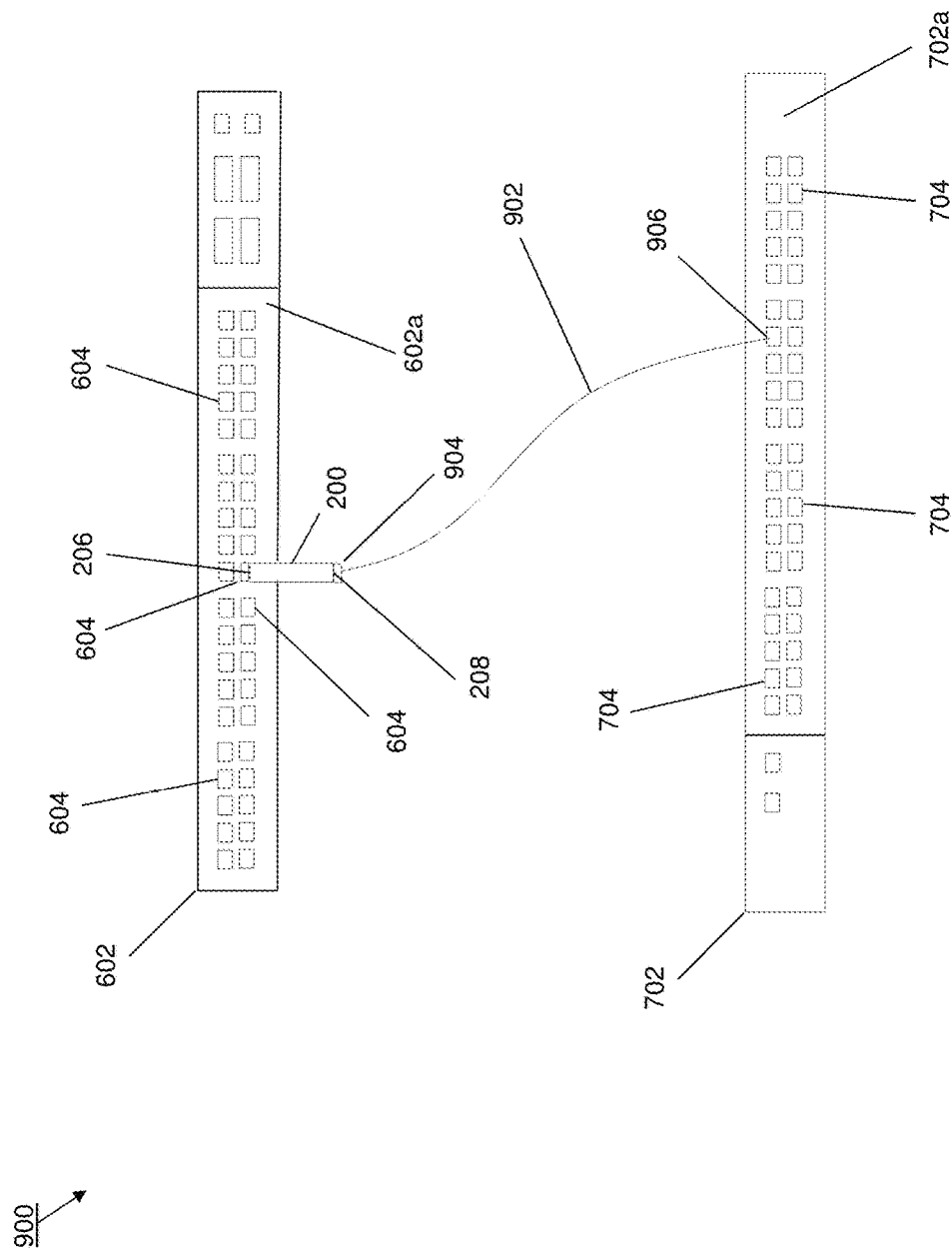
FIG. 9 is a schematic view illustrating the Ethernet switch IHS of FIG. 6 coupled to the Fibre Channel switch IHS of FIG. 7 by the protocol conversion system of FIGS. 2, 3, and/or 5.

The method 800 then proceeds to block 804 where the Ethernet interface on the protocol conversion system is coupled to the Ethernet port on the Ethernet device. Referring first to FIGS. 2, 3, 4, and 9, in an embodiment of block 804, the Ethernet interface 206 on the protocol conversion system 200 is directly connected to the Ethernet port 604 on the Ethernet switch IHS 600. In one example, the protocol conversion system 200 is the pluggable Ethernet/Fibre Channel protocol conversion transceiver 300 of FIG. 3, and the male SFP connector 306 is directly mated with the female SPF port 604 on the Ethernet switch IHS 600 (e.g., by inserting the male SFP connector 306 into a male SPF connector channel defined by the female SFP port 604 until electrical contacts on the connector end 304g (visible in FIG. 3) engage electrical contacts of the female SPF port 604. In another example, the protocol conversion system 200 is the pluggable Ethernet/Fibre Channel protocol conversion transceiver 400 of FIG. 4, and the male RJ45 connector 402 is directly mated with the female RJ45 port 604 on the Ethernet switch IHS 600 (e.g., by inserting the male RJ45 connector 402 into a male RJ45 connector channel defined by the female RJ45 port 604 on the Ethernet switch IHS 600 until electrical contacts on the connector end 406 (visible in FIG. 4) engage electrical contacts of the female RJ45 port 604). FIG. 9 illustrates the Ethernet interface 206 directly mated with the Ethernet port 604 on the Ethernet switch IHS 600. With the Ethernet interface 206 directly mated with the Ethernet port 604 on the Ethernet switch IHS 600, the Fibre Channel interface 208 is presented to a user in a spaced-apart orientation from other Ethernet ports 604 on the Ethernet switch IHS 600 (e.g., spaced apart from the Ethernet ports 604 and the outer surface 602a of the Ethernet switch IHS 600 by the length of the elongated chassis 202).

Figure 10:
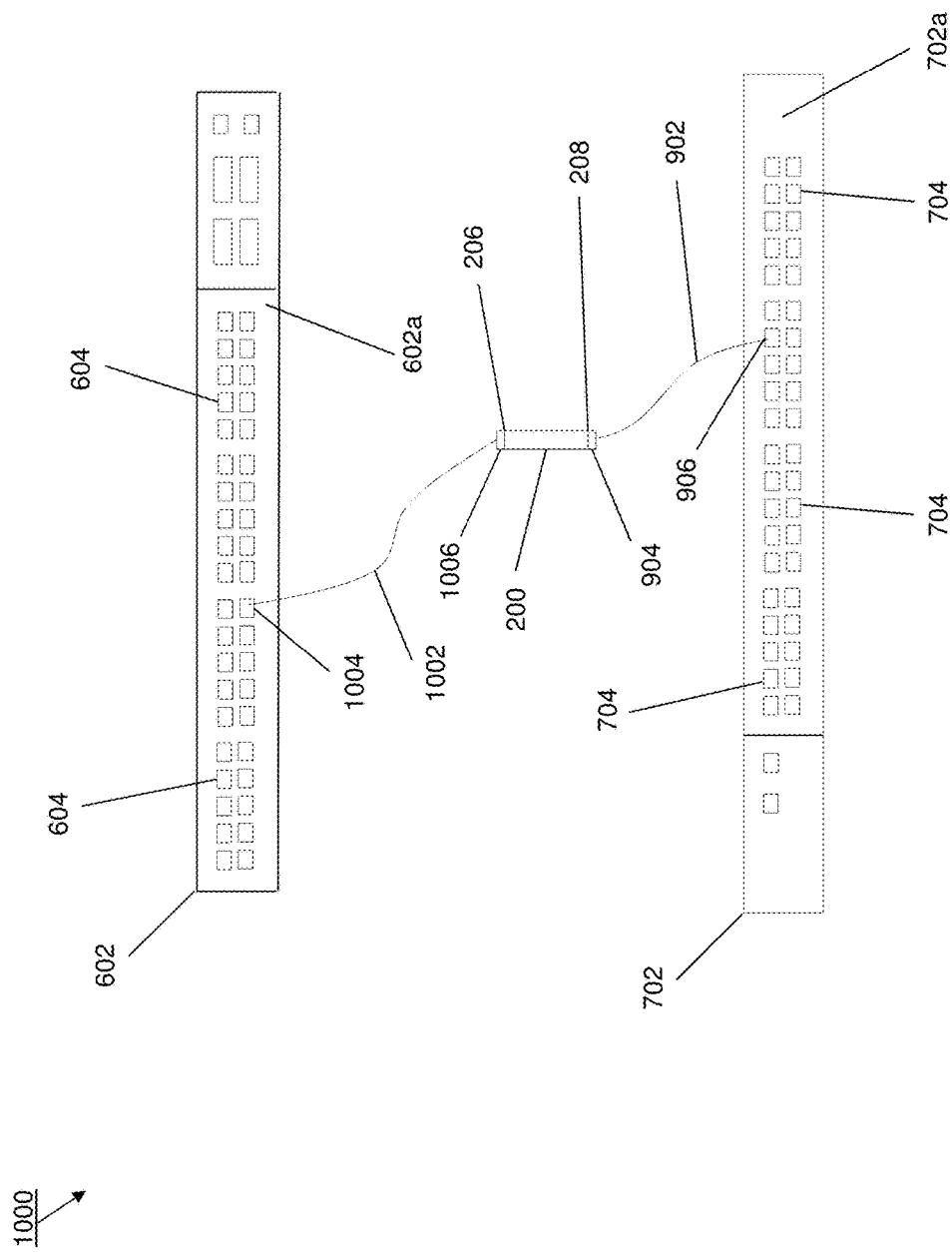
FIG. 10 is a schematic view illustrating the Ethernet switch IHS of FIG. 4 coupled to the Fibre Channel switch IHS of FIG. 5 by the protocol conversion system of FIG. 2 or 5.

Referring next to FIGS. 2, 5, and 10, in an embodiment of block 804, the Ethernet interface 206 on the protocol conversion system 200 is indirectly coupled to the Ethernet port 604 on the Ethernet switch IHS 600. In one example, the protocol conversion system 200 is the pluggable Ethernet/Fibre Channel protocol conversion transceiver 500 of FIG. 5, and the female RJ45 port 502 is coupled with the female RJ45 port 604 on the Ethernet switch IHS 600 through an Ethernet cable 1002 (e.g., by inserting a male RJ45 connector 1004 on the Ethernet cable 1002 into a male RJ45 connector channel defined by the female RJ45 port 604 on the Ethernet switch IHS 600, and inserting a male RJ45 connector 1006 on the Ethernet cable 1002 into a the male RJ45 connector channel 504 defined by the female RJ45 port 502 until electrical contacts on the connector end 304g (visible in FIG. 5) engage electrical contacts of the male RJ45 connector 1006 on the Ethernet cable 1002). FIG. 10 illustrates the Ethernet interface 206 indirectly coupled with the Ethernet port 604 on the Ethernet switch IHS 600. With the Ethernet interface 206 indirectly coupled with the Ethernet port 604 on the Ethernet switch IHS 600, the Fibre Channel interface 208 is provided by the protocol conversion system 200 on the end of the Ethernet cable 1002.

The method 800 then proceeds to block 806 where the Fibre Channel interface on the protocol conversion system is coupled to the Fibre Channel port on the Fibre Channel device. Referring to FIGS. 2, 3, 4, 5, 9, and 10, in an embodiment, the Fibre Channel interface 208 on the protocol conversion system 200 is coupled to the Fibre Channel port 704 on the Fibre Channel switch IHS 700. For example, the protocol conversion system 200 is any of the pluggable Ethernet/Fibre Channel protocol conversion transceivers 300, 400, or 500 of FIG. 3, 4, or 5, respectively, and the female Fibre Channel port 308 is coupled with the female Fibre Channel port 704 on the Fibre Channel switch IHS 700 through a Fibre Channel cable 902 (e.g., by inserting a male optical connector 904 on the Fibre Channel cable 902 into the female Fibre Channel port 704 on the Fibre Channel switch IHS 700, and inserting a male optical connector 906 on the Fibre Channel cable 902 into the female Fibre Channel port 308 on the pluggable Ethernet/Fibre Channel protocol conversion transceiver 300, 400, or 500 until electrical contacts on the male optical connector 906 engage electrical contacts of the female Fibre Channel port 308). FIGS. 9 and 10 illustrate the Ethernet switch IHS 600 communicatively connected to the Fibre Channel switch IHS 700 using the protocol conversion system 200.

The method 800 then proceeds to block 808 where the protocol conversion system converts between Ethernet protocol signals and Fibre Channel Protocol signals. In some embodiments, communications from the Ethernet switch IHS 600 to the Fibre Channel switch IHS 700 are converted by the protocol conversion system 200. For example, the protocol conversion system 200 may receive Ethernet protocol signals from the Ethernet switch IHS 600 through the Ethernet interface 206, convert those Ethernet protocol signals to Fibre Channel protocol signals, and send the Fibre Channel protocol signals through the Fibre Channel interface 208 to the Fibre Channel switch IHS 700. In some embodiments, communications from the Fiber Channel switch IHS 700 to the Ethernet switch IHS 600 are converted by the protocol conversion system 200. For example, the protocol conversion system 200 may receive Fibre Channel protocol signals from the Fiber Channel switch IHS 700 through the Fibre Channel interface 208, convert those Fibre Channel protocol signals to Ethernet protocol signals, and send the Ethernet protocol signals through the Ethernet interface 206 to the Ethernet switch IHS 600.

Referring now to FIGS. 3, 4, 5, and 8, an embodiment of the conversion of signals by the protocol conversion components 304 is provided. However, as discussed above, other protocol conversion components are envisioned as falling within the scope of the present disclosure, so the discussion below is meant to be merely exemplary. As is known in the art, Ethernet protocol signals are standardized by the Institute of Electrical and Electronics Engineers (IEEE) and include data that is divided into frames that include information such as a source address, a destination address, error-checking data, and/or other frame information known in the art. As is also known in the art, Fibre Channel protocol signals are standardized in the T11 Technical Committee of the International Committee for Information Technology Standards (INCITS). In an embodiment, Ethernet protocol signals received at the Ethernet interface 206, 306, 402, or 502 are converted to Fibre Channel signals by the electrical interface and line driver component 304*f* (e.g., the Ethernet signal processor) and in some cases with help from the protocol conversion processor component 304*e* (e.g., the CPU) using instructions and information on the memory device component 304*d* (e.g., the EEPROM). After conversion the converted signals are sent to the optical driver component 304*c* (e.g., the Fibre Channel signal processor). Similarly, in another embodiment, the optical driver component 304*c* (e.g., the Fibre Channel signal processor) converts Fibre Channel signals to Ethernet signals, in some cases with help from the protocol conversion processor component 304*e* (e.g., the CPU) using instructions and information on the memory device component 304*d* (e.g., the EEPROM). After conversion the converted signals are sent to the electrical interface and line driver component 304*f* (e.g., the Ethernet signal processor).

In an embodiment, the protocol conversion processor component 304*e* (e.g., the CPU) operates to manage the operation of all the components of the protocol conversion system, including component configuration changes, component monitoring, component data collection, component software/firmware updates. In an embodiment, the memory device component 304*d* (e.g., the EEPROM) stores software/firmware images, configurations settings/files, and log files for storage and retrieval. In an embodiment, the Fibre Channel interface components 304*b* (e.g., the laser driver and receiver) operate to convert electrical Ethernet signals into Fibre Channel optical signals (e.g., by the laser driver) and convert Fibre Channel optical signals into electrical Ethernet signals (e.g., by the laser receiver). In an embodiment, networking layers are addressed in the signal conversion in the following order: 1) physical layer, 2) data link layer, 3) application layer. In some embodiments, the components of the protocol conversion system may be integrated into a one chip solution to save power, save space, provide a desired form factor, reduce part cost, reduce total bill of material (BOM) cost, and/or provide a variety of other characteristics known in the art.

Figure 11:
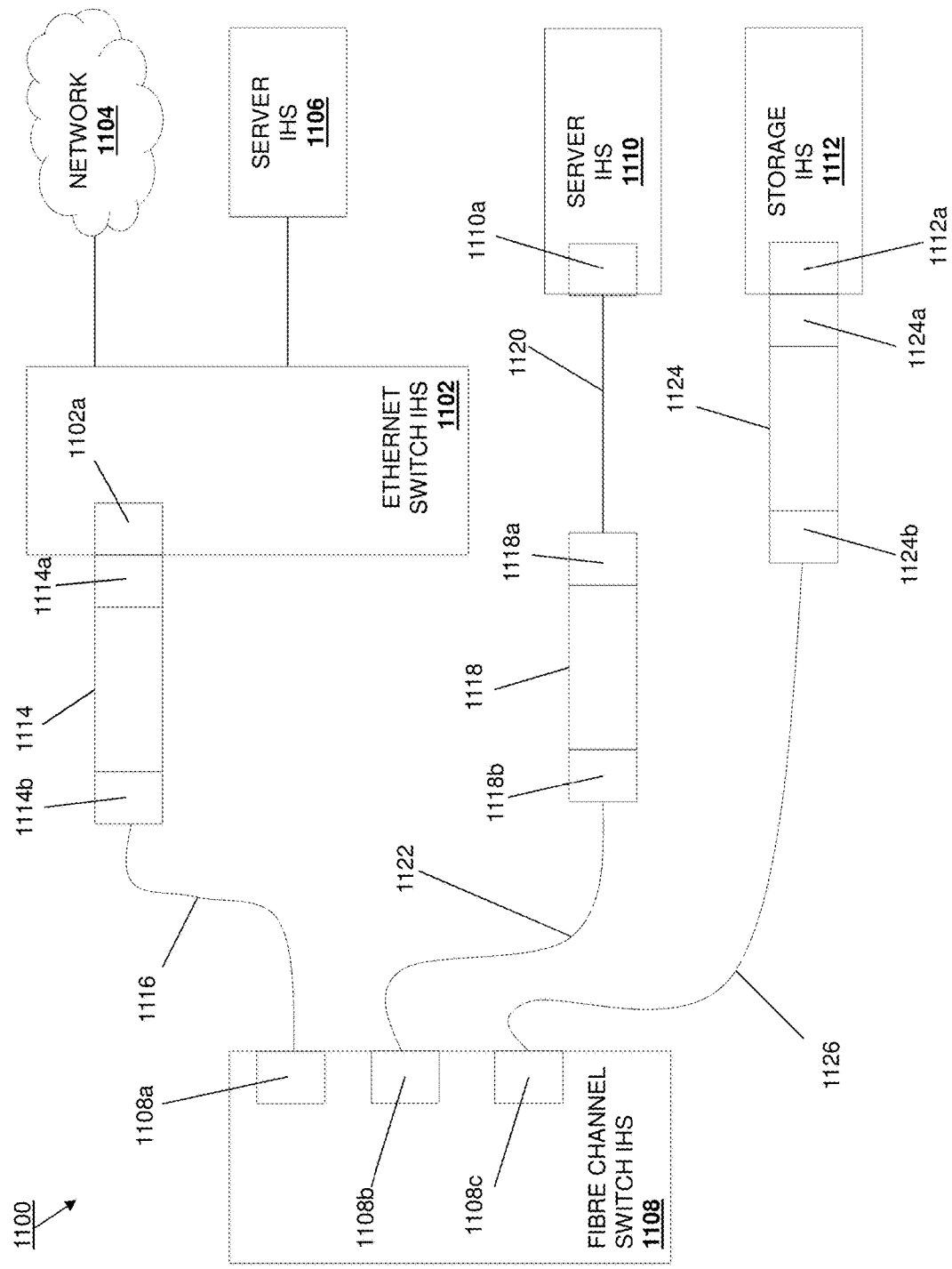
FIG. 11 is a schematic view illustrating an IHS network.

Referring now to FIG. 11, an embodiment of an IHS network 1100 is illustrated, with Ethernet devices communicating with a Fibre Channel device using the systems and methods discussed above. The IHS network 1100 includes an Ethernet switch IHS 1102 that is coupled to each of a network 1104 (e.g., a Local Area Network (LAN), the Internet, etc.) and a server IHS 1006 using methods known in the art. The IHS network 1100 also includes a Fibre Channel switch IHS 1108, a server IHS 1110, and a storage IHS 1112. The Ethernet switch IHS 1102 is communicatively coupled to the Fibre Channel switch IHS 1108 using a protocol conversion system 1114 that includes an male Ethernet connector 1114*a* that is directly mated to a female Ethernet port 1102*a* on the Ethernet switch IHS 1102, and a female Fibre Channel port 1114*b* that is coupled to a female Fibre Channel port 1108*a* on the Fibre Channel switch IHS 1108 through a Fibre Channel cable 1116 (e.g., through the mating of male Fibre Channel connectors on the Fibre Channel cable 1116 with the female Fibre Channel port 1114*b* and the female Fibre Channel port 1108*a*.) The server IHS 1110 is communicatively coupled to the Fibre Channel switch IHS 1108 using a protocol conversion system 1118 that includes a female Ethernet port 1118*a* that is coupled to a female Ethernet port 1110*a* on the server IHS 1110 through an Ethernet cable 1120 (e.g., through the mating of male Ethernet connectors on the Ethernet cable 1120 with the female Ethernet port 1118*a* and the female Ethernet port 1110*a*), and includes a female Fibre Channel port 1118*b* that is coupled to a female Fibre Channel port 1108*b* on the Fibre Channel switch IHS 1108 through a Fibre Channel cable 1122 (e.g., through the mating of male Fibre Channel connectors on the Fibre Channel cable 1122 with the female Fibre Channel port 1118*b* and the female Fibre Channel port 1108*b*). The storage IHS 1112 is communicatively coupled to the Fibre Channel switch IHS 1108 using a protocol conversion system 1124 that includes an male Ethernet connector 1124*a* that is directly mated to a female Ethernet port 1112*a* on the storage IHS 1112, and a female Fibre Channel port 1124*b* that is coupled to a female Fibre Channel port 1108*c* on the Fibre Channel switch IHS 1108 through a Fibre Channel cable 1126 (e.g., through the mating of male Fibre Channel connectors on the Fibre Channel cable 1126 with the female Fibre Channel port 1124*b* and the female Fibre Channel port 1108*c*).

Figure 12:
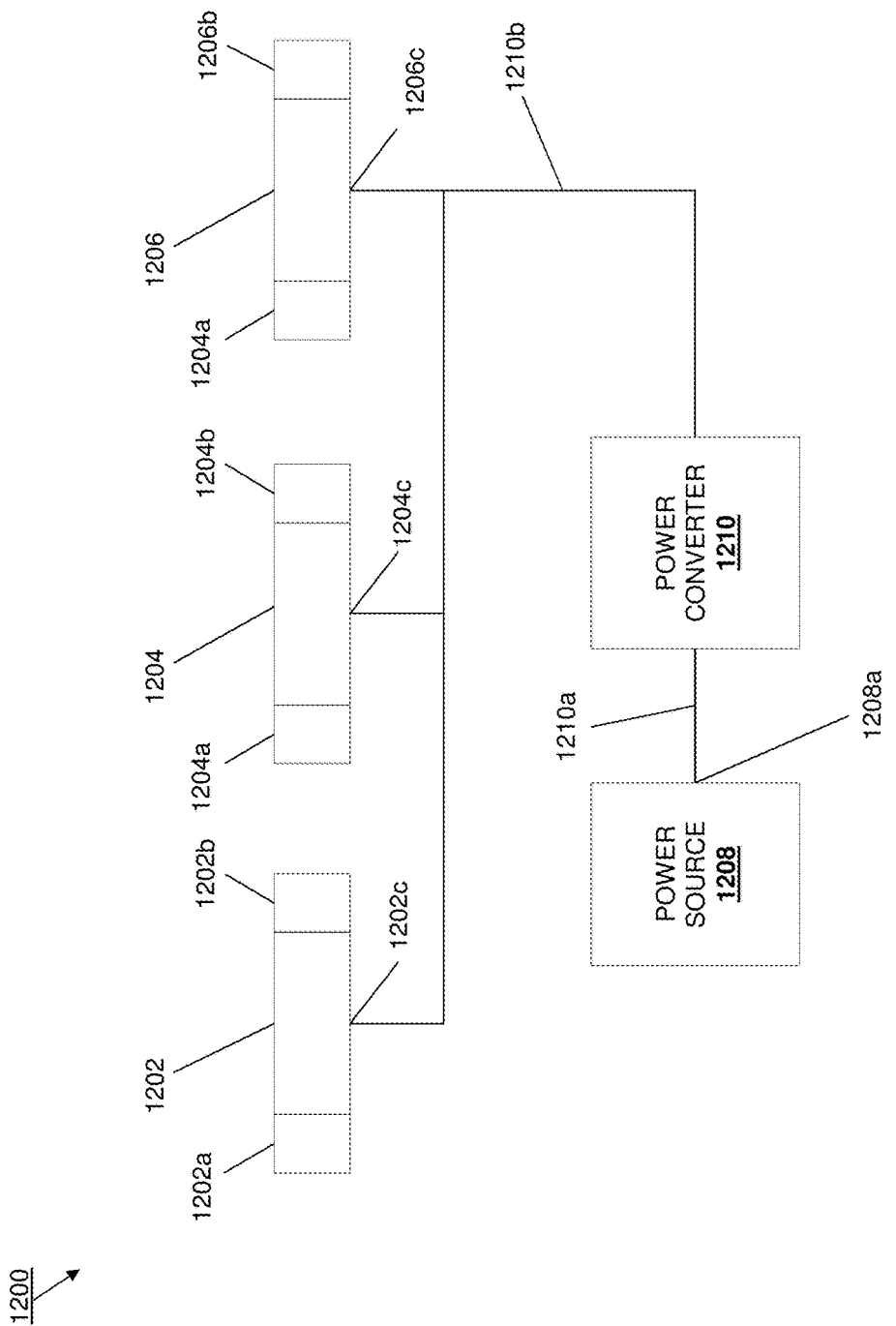
FIG. 12 is a schematic view illustrating a power system for a plurality of the protocol conversion systems of FIG. 2.

Referring now to FIG. 12, a power system 1200 for the protocol conversion systems discussed above is illustrated. In some embodiments, the protocol conversion system 200 may not receive power through the Ethernet interface 206 as discussed above, and instead power may be provided to the protocol conversion system 200 through a power connector on the chassis 202 and from a power source. The power system 1200 of FIG. 12 includes protocol conversion systems 1202, 1204, and 1206, each of which may be any of the protocol conversion systems 200, 300, 400, and/or 500 discussed above. As such, the protocol conversion system 1202 includes an Ethernet interface 1202*a* and a Fibre Channel interface 1202*b*, the protocol conversion system 1204 includes an Ethernet interface 1204*a* and a Fibre Channel interface 1204*b*, and the protocol conversion system 1206 includes an Ethernet interface 1206*a* and a Fibre Channel interface 1206*b*. In addition, the protocol conversion systems 1202, 1204, and 1206 each include a power connector 1202*c*, 1204*c*, and 1206*c*, respectively, which may be located on a chassis side wall (similar to the side wall 202*c* of the chassis 202 on the power conversion system 200.) A power source 1208 includes a power source connector 1208*a* (e.g., an Alternating Current (AC) outlet such as a wall outlet), and a power converter 1210 (e.g., an AC/Direct Current (DC) converter) may be coupled to the power source 1208 through the connection of a power cord 1210*a* to the power source connector 1208*a*. One or more power cords 1210*b* may extend from the power converter 1210 and into any or all of the power connectors 1202*c*, 1204*c*, and 1206*c* on the protocol conversion systems 1202, 1204, and/or 1206. In an embodiment, a power cord 1210*b* may extend from the power converter 1210 to the protocol conversion system 1206, and the protocol conversion systems 1204 and 1202 may be daisy chained to the protocol conversion system 1206 and each other to receive power from the power source 1208. Power from the power source 1208 may be used to power the protocol conversion components 304 (e.g., the protocol conversion processor 304*e*.)

Figure 13:
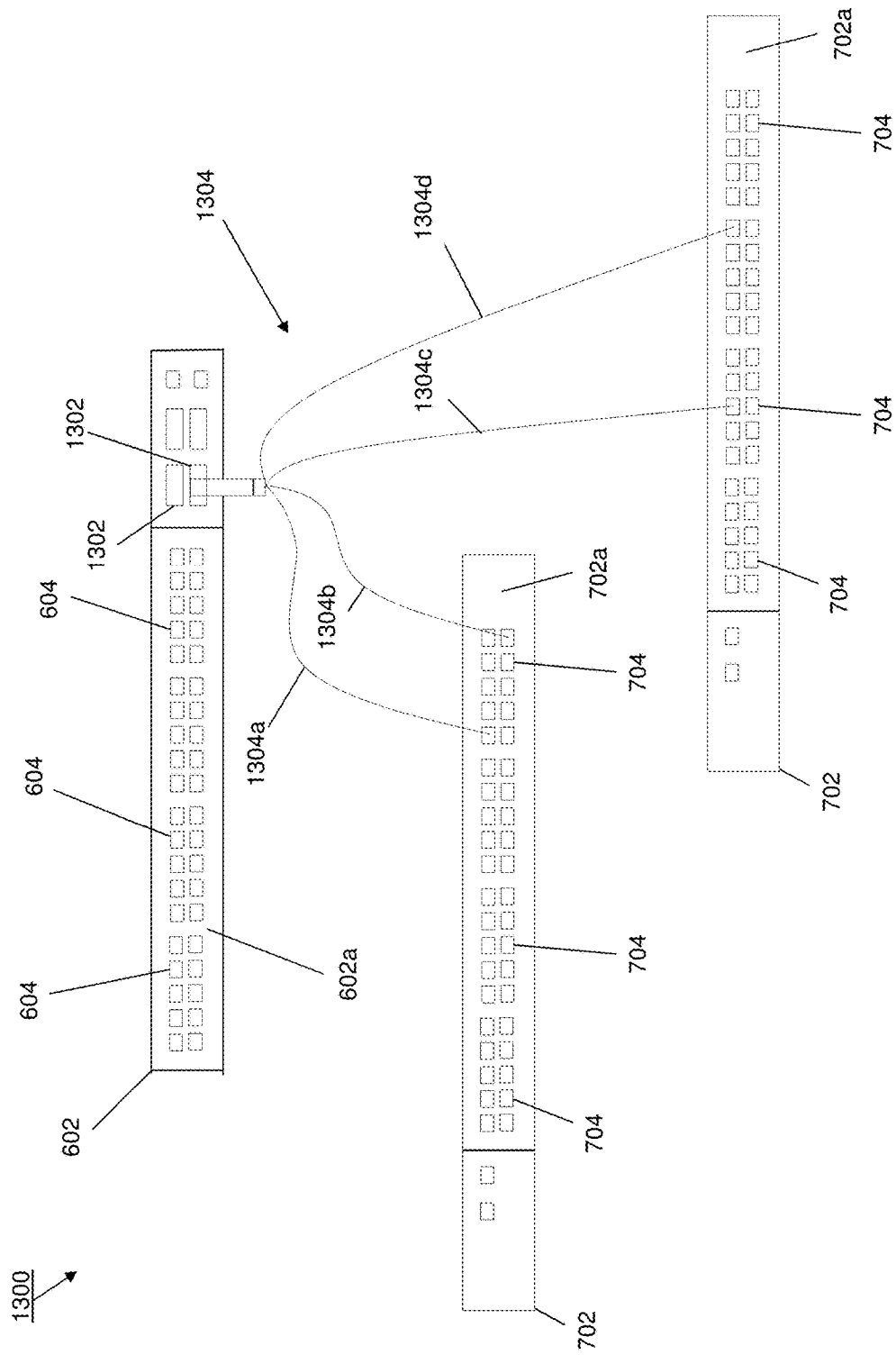
FIG. 13 is a schematic view illustrating the Ethernet switch IHS of FIG. 6 coupled to the Fibre Channel switch IHS of FIG. 7 by the protocol conversion system of FIGS. 2, 3, and/or 4.

Referring now to FIG. 13, an embodiment of a system 1300 with the Ethernet device 600 coupled to multiple Fibre Channel devices 700 via the protocol conversion system 200 is illustrated. In the illustrated embodiment, the Ethernet device 600 includes QSFP+ ports 1302, and the protocol conversion system 200 includes QSFP+ form factor components that allow it to couple to the QSFP+ port 1302 substantially as described above. In the illustrated embodiment, a branching Fibre Channel cable 1304 is coupled to the protocol conversion system 200 substantially as described above and includes a plurality of branched Fibre Channel cables 1304*a*, 1304*b*, 1304*c* and 104*d* coupled to respective Fibre Channel ports 704 on different Fibre Channel devices 700 substantially as described above. In a specific example, the branched Fibre Channel cable 1304 is a 40 G Fibre Channel cable broken into 10 G branched Fibre Channel cables 1304*a* 1304*b*, 1304*c*, and 1304*d*, each of which can be independently connected Fibre Channel ports 704 on Fibre Channel devices 700. In an embodiment, the system 1300 allows a QSFP+ port on an Ethernet device to be connected to four SFP+ ports on one or more Fibre Channel devices.

Figure 14:
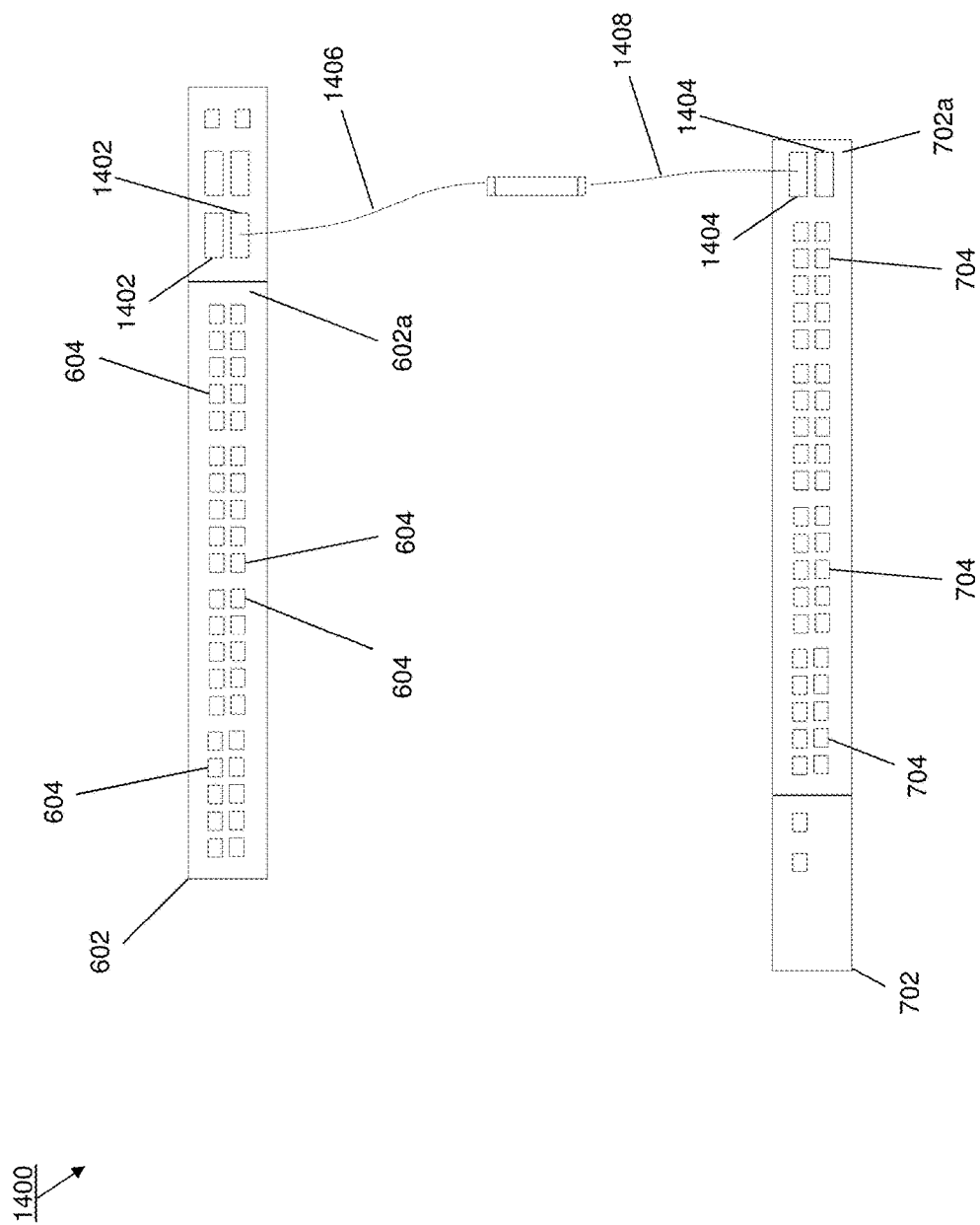
FIG. 14 is a schematic view illustrating the Ethernet switch IHS of FIG. 6 coupled to the Fibre Channel switch IHS of FIG. 7 by the protocol conversion system of FIGS. 2, and/or 5.

Referring now to FIG. 14, an embodiment of a system 1400 with the Ethernet device 600 coupled to a Fibre Channel device 700 via the protocol conversion system 200 is illustrated. In the illustrated embodiment, the Ethernet device 600 includes QSFP+ ports 1402, and the Fibre Channel device 700 includes QSFP+ ports 1404. In the illustrated embodiment, an Ethernet cable 1406 is coupled to the protocol conversion system 200 substantially as described above, and that Ethernet cable 1406 is coupled to the QSFP+ port 1404 on the Ethernet device 600 substantially as described above. A Fibre Channel cable 1408 is coupled to the protocol conversion system 200 substantially as described above, and that Fibre Channel cable 1408 is coupled to the QSFP+ port 1408 on the Fibre Channel device 700 substantially as described above. In an embodiment, the system 1300 allows a QSFP+ port on an Ethernet device to be connected to a QSFP+ port on a Fibre Channel device.

Thus, systems and methods have been described that include embodiments that provide a pluggable Ethernet/Fibre Channel transceiver that may be directly connected to an Ethernet device such that a user are provided with a Fibre Channel port for that Ethernet device that may be used to connect that Ethernet device to a Fibre Channel device. Such systems and methods enable customers to transport Fibre Channel traffic over their existing Ethernet and Fibre Channel equipment without the need to purchase expensive equipment such as converged network adapters by providing a relatively inexpensive single port solution for Ethernet protocol to Fibre Channel protocol conversion.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A protocol conversion system, comprising:
a chassis;
a first communications protocol interface included on the chassis and configured to enable first protocol communications, wherein the first communications protocol interface is the only first communications protocol interface on the chassis;
a second communications protocol interface included on the chassis and configured to enable second protocol communications that utilize a different communications protocol than the first protocol communications, wherein the second communications protocol interface is the only second communications protocol interface on the chassis;
a protocol conversion processor housed in the chassis and coupled between the first communications protocol interface and the second communications protocol interface; and a non-transitory memory storing instructions that, when executed by the protocol conversion processor, cause the protocol conversion processor to:
convert first communications protocol signals received through the first communications protocol interface to converted second communications protocol signals, and send the converted second communications protocol signals through the second communications protocol interface; and
convert second communications protocol signals received through the second communications protocol interface to converted first communications protocol signals, and send the converted first communications protocol signals through the first communications protocol interface.

2. The system of claim 1, wherein the first communications protocol interface includes a male connector.

3. The system of claim 1, wherein the first communications protocol interface includes a female connector.

4. The system of claim 1, wherein the second communications protocol interface includes a male connector.

5. The system of claim 1, wherein the second communications protocol interface includes a female connector.

6. The system of claim 1, wherein the protocol conversion processor is configured to receive power through at least one of the first communications protocol interface and the second communications protocol interface.

7. The system of claim 1, further comprising:
a power connector located on the chassis and coupled to the protocol conversion processor, wherein the power connector is configured to couple to a power source and provide power to the protocol conversion processor.

8. An information handling system (IHS), comprising:
a first device that is configured to communication via first protocol communications;
a second device that is configured to communicate via second protocol communications that utilize a different communications protocol than the first protocol communications; and
a protocol conversion device coupled between the first device and the second device, wherein the protocol conversion device includes:
a chassis;
a first communications protocol interface included on the chassis and coupled to the first device, wherein the first communications protocol interface is the only first communications protocol interface on the chassis;
a second communications protocol interface included on the chassis and coupled to the second device, wherein the second communications protocol interface is the only second communications protocol interface on the chassis;
a protocol conversion engine included in the chassis and coupled between the first communications protocol interface and the second communications protocol interface, wherein the protocol conversion engine is configured to:
convert first communications protocol signals received from the first device through the first communications protocol interface to converted second communications protocol signals, and send the converted second communications protocol signals through the second communications protocol interface to the second device; and
convert second communications protocol signals received from the second device through the second communications protocol interface to converted first communications protocol signals, and send the converted first communications protocol signals through the first communications protocol interface to the first device.

9. The IHS of claim 8, wherein the first communications protocol interface includes a male connector.

10. The IHS of claim 8, wherein the first communications protocol interface includes a female connector.

11. The IHS of claim 8, wherein the second communications protocol interface includes a male connector.

12. The IHS of claim 8, wherein the second communications protocol interface includes a female connector.

13. The IHS of claim 8, wherein the protocol conversion engine is configured to receive power through at least one of the first communications protocol interface and the second communications protocol interface.

14. The IHS of claim 8, further comprising:
a power connector located on the chassis and coupled to the protocol conversion engine, wherein the power connector is configured to couple to a power source and provide power to the protocol conversion engine.

15. A method for providing for communications between a first device and a second device, comprising:
receiving, by a protocol conversion engine included in a chassis through a first communications protocol interface that is located on the chassis and that is the only first communication protocol interface on the chassis, first protocol communications signals according to a first communications protocol;
converting, by the protocol conversion engine, the first communications protocol signals to converted second communications protocol signals according to a second communications protocol that is different than the first communications protocol;
sending, by the protocol conversion engine through a second communications protocol interface that is located on the chassis and that is the only second communications protocol interface on the chassis, the converted second communications protocol signals;
receiving, by the protocol conversion engine through the second communications protocol interface, second protocol communications signals according to the second communications protocol;
converting, by the protocol conversion engine, the second communications protocol signals to converted first communications protocol signals according to the first communications protocol; and
sending, by the protocol conversion engine through the first communications protocol interface, the converted first communications protocol signals to the first device.

16. The method of claim 15, wherein the first communications protocol interface includes a male connector.

17. The method of claim 15, wherein the first communications protocol interface includes a female connector.

18. The method of claim 15, wherein the second communications protocol interface includes a male connector.

19. The method of claim 15, wherein the second communications protocol interface includes a female connector.

20. The method of claim 15, wherein the protocol conversion engine is configured to receive power through at least one of the first communications protocol interface and the second communications protocol interface.

* * * * *